1,477,806

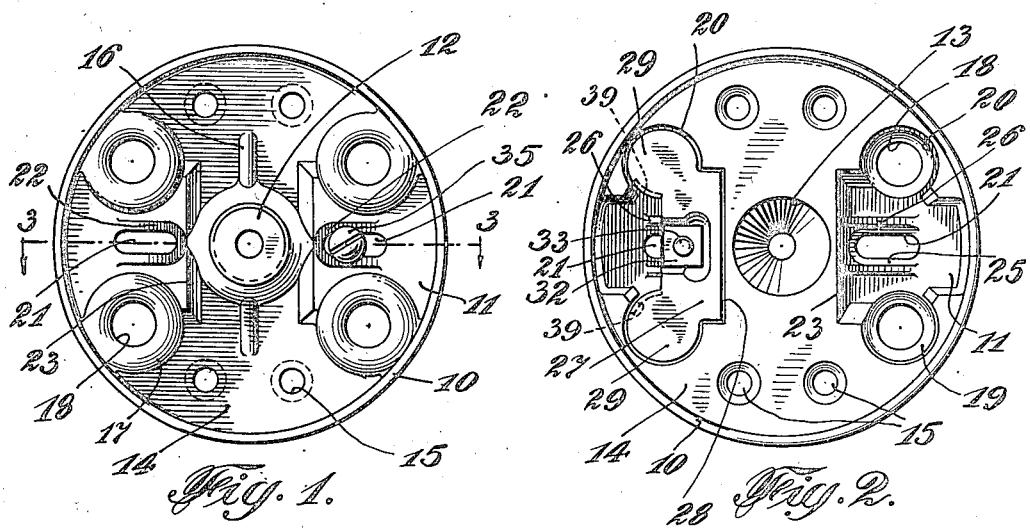
Dec. 18, 1923.
W. A. BONNELL
JUNCTION BOX AND KNOCK-OUT THEREFOR
Filed Aug. 18, 1921    2 Sheets-Sheet 1
1,477,806
Inventor
William A. Bonnell
By Leak C. Fischer
his Attorney Dec. 18, 1923. 1,477,806
W. A. BONNELL
JUNCTION BOX AND KNOCK-OUT THEREFOR
Filed Aug. 18, 1921  2 Sheets-Sheet 2
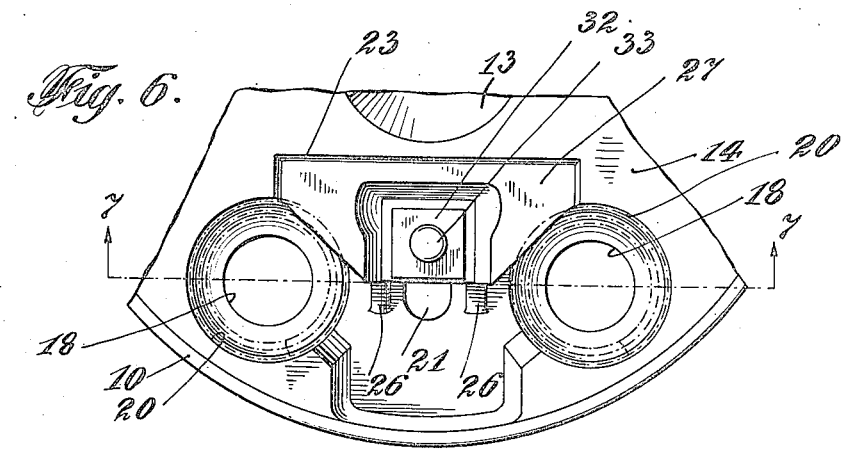
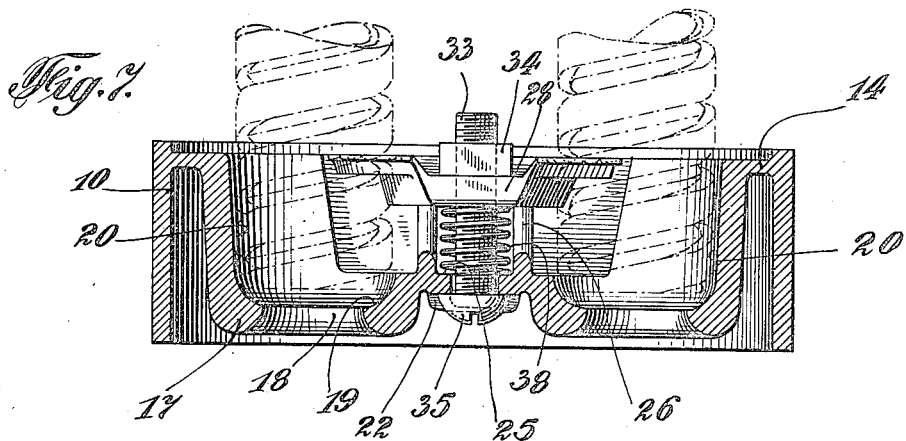
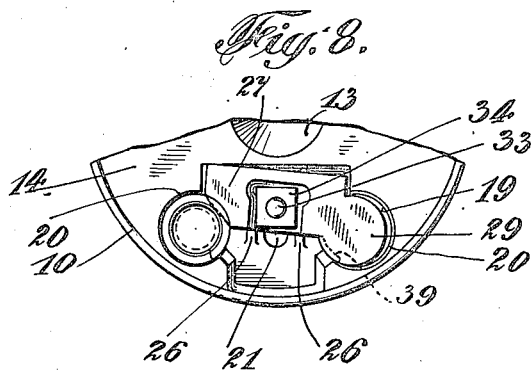
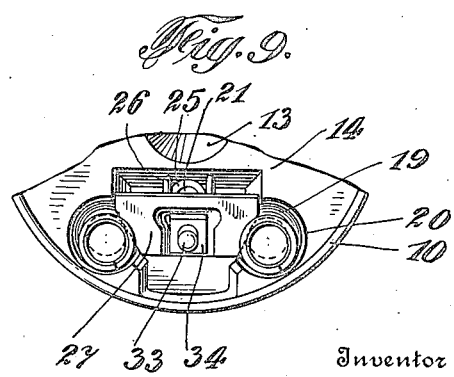
Inventor
William A. Bonnell
By Fredk C. Fischer
his Attorney Patented Dec. 18, 1923.

UNITED STATES PATENT OFFICE.

WILLIAM A. BONNELL, OF BROOKLYN, NEW YORK.

JUNCTION BOX AND KNOCK-OUT THEREFOR.

Application filed August 18, 1921. Serial No. 493,363.

*To all whom it may concern:*

Be it known that I, WILLIAM A. BONNELL, a citizen of the United States, residing at Brooklyn, in the county of Kings and State of New York, have invented new and useful Improvements in Junction Boxes and Knock-Outs Therefor, of which the following is a specification.

One of the objects of this invention is to provide a junction box in which one or more armored electrical cables or conduits may be firmly secured, irrespective of their diameters, to the body of the box.

Another object is to incorporate clamp elements, each consisting of an adjustable center having a frangible disc, known as a "knock-out" at each end adapted to act normally as a stopper for the opening at the cable recess, and which upon being broken away, present rough, raw metal clamp edges adapted to engage the cables without damage and without danger of loosing their grip.

A further purpose is to provide means for holding either a single cable or a pair of them, even if of different cross sectional area, by a single clamp, in a secure manner.

Other objects are in the simplicity of design, fewness of parts and readiness with which they can be assembled.

These and other like objects, which will become more apparent as the description progresses are attained by the novel construction, combination and arrangement of parts hereinafter described and shown in the accompanying drawings, forming a material part of this disclosure, and in which:—

Figure 1 is a top plan view of an outlet box made in accordance with the invention, one of the clamp elements being omitted.

Figure 2 is a bottom plan view of the same.

Figure 3 is a transverse sectional view taken on line 3—3 of Fig. 1.

Figure 4 is a perspective view of the clamp element looking from its lower side.

Figure 5 is a similar view of the same looking from the upper side and showing the "knock-outs" as broken away.

Figure 6 is an enlarged plan view of a fragment of the box with a pair of armored cables, uniform in diameter, held by a single clamp.

Figure 7 is a sectional view taken on line 7—7 of Fig. 6.

Figure 8 is a fragmentary plan view showing the manner of clamping a single cable.

Figure 9 is a similar view showing a pair of relatively small cables held in the box by a single clamp member.

Referring to the drawings in detail, the numeral 10 designates in general the cylindrical wall of the box body, the same being usually cast from ordinary grey iron, the shape being such as is best suited to be received in openings prepared for them.

Partial webs 11 are formed transversely across the interior of the cylinder at approximately one third of its length or height and extending centrally outward from these webs is a screw threaded nipple 12 suited to engage a gas or water pipe.

The back of this nipple element extends past the webs to a plane slightly lower than the opposite edge of the box and contains a conical opening 13 to reduce the weight of the box, the wall surrounding the base of the opening being extended on opposite sides, forming other webs 14, through which are paired counter-sunk holes 15 for the reception of screws used in maintaining the box in position, the webs and exterior of the nipple being further connected by angular stiffening ribs 16.

Extending from the webs 11, at their ends, in the direction of the nipple 12 are circular bosses 17 having rounded edges terminating slightly within the plane of the corresponding edge of the body, the inner rounded edges blending into openings 18 through the flanged lower walls 19 constituting steps or seats at the bottom of the cable sockets 20, these sockets having slightly tapering side walls terminating in the webs 14.

As will be noticed, these sockes are arranged in pairs at opposite sides of the box body, closely adjacent its wall, a portion of their juxtaposed sides being reduced to the level of the webs 11 through which, centrally between the sockets, are elongated slots 21 radial with the center of the box and provided on their opposite sides with margins 22 gradually raised from the level of the webs at their outer ends to their inner ends, presenting inclined surfaces for a purpose further on apparent.

The webs 11 and 14 are connected on opposite sides of the nipple 12 by slightly inclined walls 23 arranged in planes parallel with the axis of the sockets 20 in such a manner as to form recesses 24 between each pair of the sockets, open outwardly and to the sockets, these recesses being bounded by the walls 10 and 23, and web 11.

At each side of the slots 21 and spaced so as to leave distinct shoulders 25, are angularly faced ribs 26 extending between webs 11 and walls 23, these ribs strengthening the structure and also performing another function as will later be seen.

The combination clamp plates and knockout discs, used in connection with the box, consist preferably of cast members having a central level portion 27 presenting a straight outer edge 28 adapted to make contact with the wall 23 and formed with the ends of the plate, offset from the edge, are discs 29 suited to enter the outer ends of the sockets 20.

These discs have at their line of junction with the plate 27 weakening recesses 30 and are increased in thickness uniformly to their outer edges, on the lower sides, their tops being level with the plate 27.

In the upper surfaces of the plates, central in their length, are substantially rectangular recesses 31 receptive of nuts 32, these nuts being engaged by screw bolts 33 passing through the openings 34 at the centers of the recesses 31, the heads 35 of the bolts being seated on the marginal raised surfaces 22, the bolts passing through the slots 21 as shown.

The lower side of the plates 27, which are substantially uniform in thickness with the thickest portion of the discs 29, have a central thickened portion 36, curved at its ends and bevelled as at 37 towards the edge 28, this bevelled portion being complementary to the inclination of the ribs 26 upon which they rest in such a manner as to slide outward towards the periphery of the box under stress of the bolts 33.

The bevelled surface 37 extends from the hole 34 to the edge of the plate only, thus permitting a rocking or tilting motion to take place under certain circumstances.

Formed upon the lower sides of the discs 29, at their inner edges, adjacent the rear ends of the weakening recesses 30, are depending curved lugs 39, approximately closing the recesses 24 from top to bottom, thus preventing air currents within the box which may enter through the opening in the nipple and which might, in case of a possible short circuit, result in a conflagration.

In order to maintain the clamp plate in a normally raised position, a helically coiled expansion spring 38, encircles the bolt 33, the lower end of the spring resting upon the seat elements 25 and its upper end against the thickened surface 36 of the clamp, tending to raise the same when the bolt is slackened.

In operation, if no cables are entered in either of the paired socket openings, the clamp plate with both discs are used, the discs being held in the openings by properly adjusting the bolts.

If cables of ordinary size are used in both socket openings, as indicated in Figures 6 and 7, both discs are broken away at the weakening recesses 30, the extending, jagged ends of the plates coming in contact with the exterior of the cables, under stress of the bolts, holding the same firmly and tending to press them into the bottom of the sockets.

Should the cables be relatively small, as is shown in Figure 9, the clamp plates slide outward and downward, rocking on the ribs 26 until suitable engagement is effected, the bolts moving freely in the slots 21 for that purpose.

A pivoting effect takes place where the clamp is used to secure a single cable, as in Fig. 8, where one of the discs remains in its normal position, covering the opening to the socket and the other, broken end of the clamp plate engages the cable.

From the foregoing it will be seen that a self-adjusting clamp plate is used, the same being capable of sliding, eccentric or pivoting and rocking movement, as may be demanded by the attendant conditions and circumstances.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:—

1. A junction box comprising a body containing paired cable sockets, inclined ribs formed with said body parallel to a tangent to said sockets, a clamp plate having a part slidable on said ribs, knock-out discs at the ends of said plate, said discs being frangible at the junction between the plate and disc, and means for drawing said plate, after the rupture of said discs, downward upon said inclined ribs to grip cables entered in said sockets.

2. A junction box comprising a body containing paired cable sockets, inclined ribs formed with said body parallel to a tangent to said sockets, a clamp plate having a part slidable on said ribs, knock-out discs at the ends of said plate, suited to cover the openings in said sockets, said discs being frangible at the junction between the plate and disc from said plate, and means for moving the broken end of said plate to grip a cable entered in the uncovered socket, said plate pivoting on the remaining disc and sliding on said ribs.

3. A junction box comprising a body containing paired cable sockets, inclined ribs formed with said body in spaced relation centrally between said sockets, there being a slot through said body between said ribs, a clamp plate capable of self-adjustment by a combined sliding and rocking movement on said ribs, pivoting at the end first in contact with a cable in one of said sockets, and means for drawing said clamp plate into said body and at the same time towards the axis of said sockets.

4. In a junction box having paired cable sockets, a symmetrical frangible plate element adjustably engaged between each pair of sockets, and knock-out discs formed with the ends of said element engageable in each of the paired sockets, said discs being joined to said element by attenuated necks arranged tangentially to the discs.

5. In a junction box having paired cable sockets and an open recess therebetween, a symmetrical plate adjustably engaging the box, frangible knock-out discs formed with the ends of said plate normally engaging said sockets, and projections on said discs adapted to close said sockets from the mentioned recesses.

6. In a junction box having paired cable sockets, partially open toward each other, a symmetrical plate engaging the box between said sockets, frangible knock-out discs at the ends of said plate, said discs fitting the sockets, curved projections on said discs forming complementary portions of the walls of said sockets, and means for clamping said plate in operative position.

This specification signed and witnessed this 16th day of August, 1921.

WILLIAM A. BONNELL.

Witnesses:
FRED'K C. FISCHER.
F. NOLL.